United States Patent
Luo et al.

(10) Patent No.: US 10,153,974 B2
(45) Date of Patent: Dec. 11, 2018

(54) SOFTWARE DEFINED NETWORK TRAFFIC CONGESTION CONTROL

(71) Applicant: Futurewei Technologies, Inc., Plano, TX (US)

(72) Inventors: Min Luo, Cummings, GA (US);
Shih-Chun Lin, Alpharetta, GA (US);
Ian F. Akyildiz, Alpharetta, GA (US)

(73) Assignee: Futurewei Technologies, Inc., Plano, TX (US)

(*) Notice: Subject to any disclaimer, the term of this patent is extended or adjusted under 35 U.S.C. 154(b) by 11 days.

(21) Appl. No.: 15/380,545

(22) Filed: Dec. 15, 2016

(65) Prior Publication Data
US 2017/0302580 A1 Oct. 19, 2017

Related U.S. Application Data

(60) Provisional application No. 62/321,994, filed on Apr. 13, 2016.

(51) Int. Cl.
*H04L 12/801* (2013.01)
*H04L 12/26* (2006.01)
*H04L 12/813* (2013.01)
*H04L 12/24* (2006.01)

(52) U.S. Cl.
CPC ........ *H04L 47/12* (2013.01); *H04L 41/0896* (2013.01); *H04L 43/0852* (2013.01); *H04L 43/0876* (2013.01); *H04L 43/16* (2013.01); *H04L 47/18* (2013.01); *H04L 47/20* (2013.01)

(58) Field of Classification Search
CPC . H04L 47/12; H04L 41/0896; H04L 43/0852; H04L 43/0876; H04L 43/16; H04L 47/18; H04L 47/20

USPC .......................................... 370/229, 230, 232
See application file for complete search history.

(56) References Cited

U.S. PATENT DOCUMENTS

| | | | | |
|---|---|---|---|---|
| 6,801,502 B1* | 10/2004 | Rexford | ................. | H04L 45/00 370/235 |
| 2008/0192636 A1* | 8/2008 | Briscoe | ................. | H04L 47/10 370/236 |
| 2010/0248643 A1* | 9/2010 | Aaron | ................. | H04L 1/0002 455/68 |

OTHER PUBLICATIONS

Alizadeh, M., et al., "Data Center TCP (DCTCP)", SIGCOMM' 10, ACM SIGCOMM Computer Communication Review, 40(4), (2010), 63-74.
Dukkipati, N., et al., "Rate Control Protocol (RCP): Congestion Control to Make Flows Complete Quickly", Ph.D Thesis, Stanford University, (2008), 168 pgs.
Ghobadi, M., et al., "Rethinking End-to-End Congestion Control in Software-Defined Networks", In Proc. of the 11th ACM Workshop on Hot Topics in Networks (HotNets-XI), (Oct. 2012), 6 pgs.

(Continued)

*Primary Examiner* — Obaidul Huq
(74) *Attorney, Agent, or Firm* — Schwegman Lundberg & Woessner, P.A.

(57) ABSTRACT

A method includes obtaining traffic statistics of accepted hybrid traffic at a controller of a software defined network that includes multiple local switches coupled by links, calculating an end to end delay associated with the accepted hybrid traffic, determining network stability thresholds from each local switch as a function of network congestion, determining an adjusted rate decision policy as a function of the end to end delay and the network stability thresholds, the adjusted rate decision policy for use by an edge switch to determine whether or not to accept offered traffic loads.

23 Claims, 15 Drawing Sheets

(56) References Cited

OTHER PUBLICATIONS

Hong, C.-Y., et al., "Finishing Flows Quickly with Preemptive Scheduling", SIGCOMM '12, ACM SIGCOMM Computer Communication Review, 42(4), (2012), 127-138.
Jang, K., et al., "Silo: Predictable Message Latency in the Cloud", in Proceedings of the 2015 ACM Conference on Special Interest Group on Data Communication, ACM, (2015), 435-448.
Ji, B., et al., "Delay-Based Back-Pressure Scheduling in Multi-Hop Wireless Networks", IEEE INFOCOM 2011, (2011), 2579-2587.
Mittal, R., et al., "TIMELY: RTT-based Congestion Control for the Datacenter", SIGCPMM '15, ACM Conference on Special Interest Group on Data Communication, (2015), 537-550.
Neely, M. J., et al., "Fairness and Optimal Stochastic Control for Heterogeneous Networks", IEEE/ACM Trans. Netw., vol. 16, No. 2, (Apr. 2008), 396-409.
Perry, J., et al., "Fastpass: A Centralized "Zero-Queue" Datacenter Network", In Proceedings of the 2014 ACM Conference on SIGCOMM, (2014), 307-318.
Rothschild, J., "High Performances at Massive Scale—Lessons Learned at Facebook", (Oct. 12, 2009), 1 pg.
Wilson, C., et al., "Better Never than Late: Meeting Deadlines in Datacenter Networks", SIGCOMM '11, ACM SIGCOMM Computer Communication Review, vol. 41, (2011), 50-61.
Xia, Y., et al., "One More Bit is Enough", IEEE/ACM Trans. Netw., 16(6), (Dec. 2008), 1281-1294.
Zats, D., et al., "DeTail: Reducing the Flow Completion Time Tail in Datacenter Networks", ACM SIGCOMM Computer Communication Review, 42(4), (2012), 139-150.
Zhang, J., et al., "Taming TCP Incast Throughput Collapse in Data Center Networks", in: IEEE ICNP, (2013), 1-10.

\* cited by examiner

Network utility function: $U_f(\lambda_f) = \beta_f \lambda_f^{1-\alpha_f}/(1-\alpha_f), \forall f \in F$, where $\beta_f$ and $\alpha_f$ can be assigned by system architects for fairness among flows. ~1205

$\{\lambda_f, \forall f \in F\}$ denotes traffic arrival rates ~1206

$\{z_f^{(i,j)}, \forall (i,j) \in (L), f \in F\}$ denotes routing decisions ~1207

$\{\mu^{(i,j)}, \forall (i,j) \in (L)\}$ denotes allowable link transmission rates ~1208

Cross-layer System Design Problem ~1210

Find: $\lambda_f, z_f^{(i,j)}, \mu^{(i,j)} \quad \forall (i,j) \in \mathcal{L}, f \in F$ ~1212

Maximize $\sum_{f \in F} U_f(\lambda_f) = \sum_{f \in F} \beta_f \frac{\lambda_f^{1-\alpha_f}}{1-\alpha_f}$ ~1215

Subject to $\sum_{f \in F} z_f^{(i,j)} \leq \mu^{(i,j)}, \forall (i,j) \in \mathcal{L};$ ~1220

1225~ $\sum_{j \in n_i} z_f^{(i,j)} - z_f^{(j,i)} \geq \lambda_f \mathbb{I}_{\{i=s_f\}}, \forall i \neq d_f, f \in F;$ 1230~ $\lambda_f, z_f^{(i,j)}, \mu^{(i,j)} \geq 0, \forall (i,j) \in \mathcal{L}, f \in F$

FIG. 12

$$L(\lambda, \mathbf{z}, \mu; \sigma) = \sum_{f \in F} U_f(\lambda_f) + \sum_{(i,j) \in \mathcal{L}} \sigma_1^{(i,j)} [\mu^{(i,j)} - \sum_{f \in F} z_f^{(i,j)}]$$
$$+ \sum_{f \in F} \sum_{i \neq d_f} \sigma_2^{f,i} [\sum_{j \in n_i} z_f^{(i,j)} - z_f^{(j,i)} - \lambda_f \mathbb{1}_{\{i=s_f\}}]$$
$$+ \sum_{f \in F} \sigma_3^f \lambda_f + \sum_{f \in F} \sum_{(i,j) \in \mathcal{L}} \sigma_4^{f,(i,j)} z_f^{(i,j)}$$
$$+ \sum_{(i,j) \in \mathcal{L}} \sigma_5^{(i,j)} \mu^{(i,j)}$$

where $\sigma_x, x = 1, \ldots, 5$ denote Lagrange multipliers ~1310

$$\mu^* = \arg\max_{\mu \in \Gamma_\mu} \{ \sum_{(i,j) \in \mathcal{L}} \sigma_5^{(i,j)} \mu^{(i,j)} \} \quad \sim 1315$$

$$\min_{\mathbf{x}} \; g(\mathbf{x}) \quad \sim 1320$$
$$\text{s.t.} \quad \mathbf{A}\mathbf{x} \leq 0$$

$$g(\mathbf{x}) \triangleq -\frac{1}{t} \sum_{f \in F} U_f(\lambda_f) - \sum_{(i,j) \in \mathcal{L}} \log(\mu^{(i,j)} - \sum_{f \in F} z_f^{(i,j)})$$
$$- \sum_{f \in F} \log \lambda_f - \sum_{f \in F} \sum_{(i,j) \in \mathcal{L}} \log z_f^{(i,j)} + \frac{\rho}{2t} \|\mathbf{A}\mathbf{x}\|_2^2 \quad \sim 1325$$

FIG. 13

$$\max_{\mu} \sum_{(i,j) \in \mathcal{L}} [W^{(i,j)}(t)]^{\alpha^{(i,j)}} \mu^{(i,j)}(t) \quad \sim 1410$$
$$\text{s.t.} \quad \mu(t) \in \Gamma_\mu$$

$$\max_{\mu} \sum_{(i,j) \in \mathcal{L}} W_{LIFO}^{(i,j)}(t) \mu^{(i,j)}(t) \quad \sim 1420$$
$$\text{s.t.} \quad \mu(t) \in \Gamma_\mu$$

FIG. 14

$$\begin{aligned}&\min_{\mathbf{x}} \quad g(\mathbf{x})\\&\text{s.t.} \quad \mathbf{Ax} \leq \mathbf{0}\end{aligned}$$

$$g(\mathbf{x}) \triangleq -\frac{1}{t}\sum_{f \in F} U_f(\lambda_f) - \sum_{(i,j) \in \mathcal{L}} \log\left(\mu^{(i,j)} - \sum_{f \in F} z_f^{(i,j)}\right)$$

$$- \sum_{f \in F} \log \lambda_f - \sum_{f \in F}\sum_{(i,j) \in \mathcal{L}} \log z_f^{(i,j)} + \boxed{\frac{\rho}{2t}\|\mathbf{Ax}\|_2^2}$$

SECOND ORDER PENALTY (circled term)

~1510

Perturbed KKT system:   ~1515

$$(\nabla_\mathbf{x} g(\mathbf{x}))^T + \mathbf{y}^T \mathbf{A} = \mathbf{0}^T$$
$$-\mathbf{y}^T \text{diag}(\mathbf{Ax}) = \mathbf{1}^T$$
$$\mathbf{x} > \mathbf{0}, \ \mathbf{Ax} < \mathbf{0}$$
$$\mathbf{y} > \mathbf{0}$$

Primal-dual solution:   ~1520

$$\begin{bmatrix} \mathbf{x}^{m+1} \\ \mathbf{y}^{m+1} \end{bmatrix} = \begin{bmatrix} \mathbf{x}^m \\ \mathbf{y}^m \end{bmatrix} + \delta^m \begin{bmatrix} \Delta \mathbf{x}^m \\ \Delta \mathbf{y}^m \end{bmatrix},$$

where $m \geq 0$ denotes the iteration number

*FIG. 15*

STEP-SIZE $\delta^m$ ~1610

$$\begin{bmatrix} \mathbf{W}^m & \mathbf{A}^T \\ -\mathbf{\Lambda}^m\mathbf{A} & -\mathbf{\Psi}^m \end{bmatrix} \begin{bmatrix} \Delta\mathbf{x}^m \\ \Delta\mathbf{y}^m \end{bmatrix} = \begin{bmatrix} -\mathbf{\Xi}^m - \mathbf{A}^T\mathbf{y}^m \\ \mathbf{\Psi}^m\mathbf{y}^m + \mathbf{1} \end{bmatrix}$$

where $\mathbf{\Xi}^m \triangleq \nabla_\mathbf{x} g(\mathbf{x}^m)$, $\mathbf{W}^m \triangleq \nabla_\mathbf{x}^2 g(\mathbf{x}^m)$, $\mathbf{\Lambda}^m \triangleq \text{diag}(\mathbf{y}^m)$, and $\mathbf{\Psi}^m \triangleq \text{diag}(\mathbf{A}\mathbf{x}^m)$.

$$\Delta\mathbf{x}^m = -(\mathbf{W}^m)^{-1}[\mathbf{\Xi}^m + \mathbf{A}^T(\mathbf{y}^m + \Delta\mathbf{y}^m)]$$ ~1620

$$\min_{\bar{\mathbf{y}}^{m+1}} \|\mathbf{\Sigma}^m\bar{\mathbf{y}}^{m+1} - \mathbf{b}^m\|_2^2$$
$$\text{s.t.} \quad \mathbf{\Sigma}^m\bar{\mathbf{y}}^{m+1} = \mathbf{b}^m$$

where $\bar{\mathbf{y}}^{m+1} \triangleq \mathbf{y}^m + \Delta\mathbf{y}^m$ and $\mathbf{b}^m \triangleq -\mathbf{A}(\mathbf{W}^m)^{-1}\mathbf{\Xi}^m + (\mathbf{\Lambda}^m)^{-1}\mathbf{1}$

FIG. 16

SOFTWARE DEFINED NETWORK TRAFFIC CONGESTION CONTROL

RELATED APPLICATION

This application claims priority to U.S. Provisional Application Ser. No. 62/321,994 (entitled "Software Defined Network Traffic Congestion Control," filed Apr. 13, 2016) which is incorporated herein by reference.

FIELD OF THE INVENTION

The present disclosure is related to network traffic congestion control, and in particular to adaptive congestion traffic control in a software defined network.

BACKGROUND

Networks are getting larger to handle communications between more and more devices, referred to as source nodes and destination nodes. Networks need to be designed and managed to handle a commensurate increase in traffic. Software defined networks involve the use of software running on a centralized controller to view network traffic and make network control programmable at a high level, the control plane, by decoupling network control from traffic forwarding functions of the data plane.

The control plane may include a routing table or similar data structure that defines what to do with incoming traffic, which may be in the form of packets of data. Control plane functions may also include routing protocols to use, defining packet priorities and discarding selected packets among other higher level functions. The data plane, also known as the forwarding plane, defines what to do with a packet received at an inbound interface of a router, such as looking up a destination address and sending the packet to a corresponding outbound interface.

Current network management considers light tail traffic in managing traffic at the control plane level. Light tail (LT) traffic is characterized by end to end (E2E) transfers of smaller files, most of which may involve a small number of packets to transfer. Typical examples are text messaging and emails with or without small attachments. LT traffic may be contrasted with heavy tail (HT) traffic, which involves large files, such as video files or video streaming, which requires a significant number of packets to effect the transfer, and can also result in global congestion and large delays in traffic deliver from a source nodes to a destination nodes of the network.

LT traffic is controlled by adjusting delay based on queue length in switches or by packet delays at the head of the line (HoL) of a queue with a first order convergence rate. Such control can be fairly loss free for purely LT traffic, and result in some E2E delay for hybrid traffic that includes both LT and HT traffic. Signaling overhead includes exchange of queue length information between switches in the network. Further prior attempts to control congestion may be heuristic or measurement-based designs that employ rate or window size assignments for simple admission control.

SUMMARY

A method includes obtaining traffic statistics of accepted hybrid traffic at a controller of a software defined network that includes multiple local switches coupled by links, calculating an end to end delay associated with the accepted hybrid traffic, determining network stability thresholds from each local switch as a function of network congestion, determining an adjusted rate decision policy as a function of the end to end delay and the network stability thresholds, the adjusted rate decision policy for use by an edge switch to determine whether or not to accept offered traffic loads.

Various examples are now described to introduce a selection of concepts in a simplified form that are further described below in the detailed description. The Summary is not intended to identify key or essential features of the claimed subject matter, nor is it intended to be used to limit the scope of the claimed subject matter.

In example 1, a method includes obtaining accepted hybrid traffic statistics at a controller of a software defined network that includes multiple local switches coupled by links, calculating an end to end delay associated with the accepted hybrid traffic, determining network stability thresholds from each local switch as a function of network congestion, determining an adjusted rate decision policy as a function of the end to end delay and the network stability thresholds, the adjusted rate decision policy for use by an edge switch to determine whether or not to accept offered traffic loads.

Example 2 includes the method of example 1 wherein the network stability thresholds define delay stability regions that comprise a set of allowable traffic arrival rates which can be covered by scheduling the traffic in accordance with a traffic policy and which won't cause network congestion.

Example 3 includes the method of any of examples 1-2 wherein the accepted traffic comprises hybrid traffic that includes heavy tail (HT) traffic and light tail (LT) traffic.

Example 4 includes the method of example 3 wherein the end to end delay comprises a latest packet delay and wherein the adjusted rate decision policy is adjusted to provide a bounded delay for the hybrid traffic.

Example 5 includes the method of any of examples 1-4 and further including adjusting routing as a function of the accepted hybrid traffic statistics.

Example 6 includes the method of example 5 wherein adjusting routing comprises performing scheduling based on a last in first out (LIFO) delay maximum weight scheduling (DMWS) function, performing routing based on a distributed Newton function, and performing congestion control through alternating direction method of multipliers (ADMM).

Example 7 includes the method of example 6 wherein a convergence rate is a second order function.

In example 8, a system includes processor, a network connector to couple to a software defined network, and a storage device to store a program for execution by the processor to perform operations. The operations include obtaining accepted hybrid traffic statistics at a controller of a software defined network that includes multiple local switches coupled by links, calculating an end to end delay associated with the accepted hybrid traffic, determining network stability thresholds from each local switch as a function of network congestion, determining an adjusted rate decision policy as a function of the end to end delay and the network stability thresholds, the adjusted rate decision policy for use by an edge switch to determine whether or not to accept offered traffic loads.

Example 9 includes the system of example 8 wherein the network stability thresholds define delay stability regions that comprise a set of allowable traffic arrival rates which can be covered by scheduling the traffic in accordance with a traffic policy and which won't cause network congestion.

Example 10 includes the system of any of examples 8-9 wherein the accepted traffic comprises hybrid traffic that includes heavy tail (HT) traffic and light tail (LT) traffic.

Example 11 includes the system of example 10 wherein the end to end delay comprises a latest packet delay and wherein the adjusted rate decision policy is adjusted to provide a bounded delay for the hybrid traffic.

Example 12 includes the system of any of examples 8-11 wherein the operations further comprise adjusting routing as a function of the accepted hybrid traffic statistics.

Example 13 includes the system of example 12 wherein adjusting routing comprises performing scheduling based on a last in first out (LIFO) delay maximum weight scheduling (DMWS) function, performing routing based on a distributed Newton function, and performing congestion control through alternating direction method of multipliers (ADMM).

Example 14 includes the system of example 13 wherein a convergence rate is a second order function.

In example 15, a computer readable storage device has instruction stored thereon for execution by a computer to perform operations including obtaining accepted hybrid traffic statistics at a controller of a software defined network that includes multiple local switches coupled by links, calculating an end to end delay associated with the accepted hybrid traffic, determining network stability thresholds from each local switch as a function of network congestion, determining an adjusted rate decision policy as a function of the end to end delay and the network stability thresholds, the adjusted rate decision policy for use by an edge switch to determine whether or not to accept offered traffic loads.

Example 16 includes the computer readable storage device of example 15 wherein the network stability thresholds define delay stability regions that comprise a set of allowable traffic arrival rates which can be covered by scheduling the traffic in accordance with a traffic policy and which won't cause network congestion.

Example 17 includes the computer readable storage device of example 16 wherein the accepted traffic comprises hybrid traffic that includes heavy tail (HT) traffic and light tail (LT) traffic.

Example 18 includes the computer readable storage device of example 17 wherein the end to end delay comprises a latest packet delay and wherein the adjusted rate decision policy is adjusted to provide a bounded delay for the hybrid traffic.

Example 19 includes the computer readable storage device of any of examples 15-18 wherein the operations further comprise adjusting routing as a function of the obtained accepted load hybrid traffic statistics.

Example 20 includes the computer readable storage device of example 19 wherein adjusting routing includes performing scheduling based on a last in first out (LIFO) delay maximum weight scheduling (DMWS) function, performing routing based on a distributed Newton function, and performing congestion control through alternating direction method of multipliers (ADMM).

In Example 21, a method includes obtaining traffic statistics of accepted hybrid traffic at a controller of a software defined network that includes multiple local switches coupled by links, calculating an end to end delay associated with the accepted traffic, modifying routing as a function of the traffic statistics to achieve maximum available capacity, and determining an adjusted rate decision policy as a function of the calculated end to end delay and an established delay-stability region, balancing maximum available capacity with a bounded delay for use by edge switches to determine whether or not to accept the offered hybrid traffic loads.

Example 22 includes the method of example 21 wherein each edge switch receives an individual switch adjusted rate decision policy.

Example 23 includes the method of example 21 wherein determining an adjusted rate decision policy utilizes a delay based weight for each queue of the switches.

BRIEF DESCRIPTION OF THE DRAWINGS

FIG. 12 illustrates a cross-layer system design problem to be solved for an optimal joint design framework in order to find the optimal allowable traffic arrival rates and throughput optimal serving sequence at the same time according to an example embodiment.

FIG. 13 illustrates one method of solving the cross layer system optimization problem according to an example embodiment.

FIG. 14 illustrates a method of solving the flow serving sequence for throughput optimal scheduling with respect to hybrid heavy tail/light tail (HT/LT) traffic according to an example embodiment.

FIG. 15 illustrates a method of addressing fast congestion control utilizing accelerated joint routing and congestion control according to an example embodiment.

FIG. 16 illustrates further details regarding the primal-dual solution for fast congestion control according to an example embodiment.

DETAILED DESCRIPTION

Figure 1:
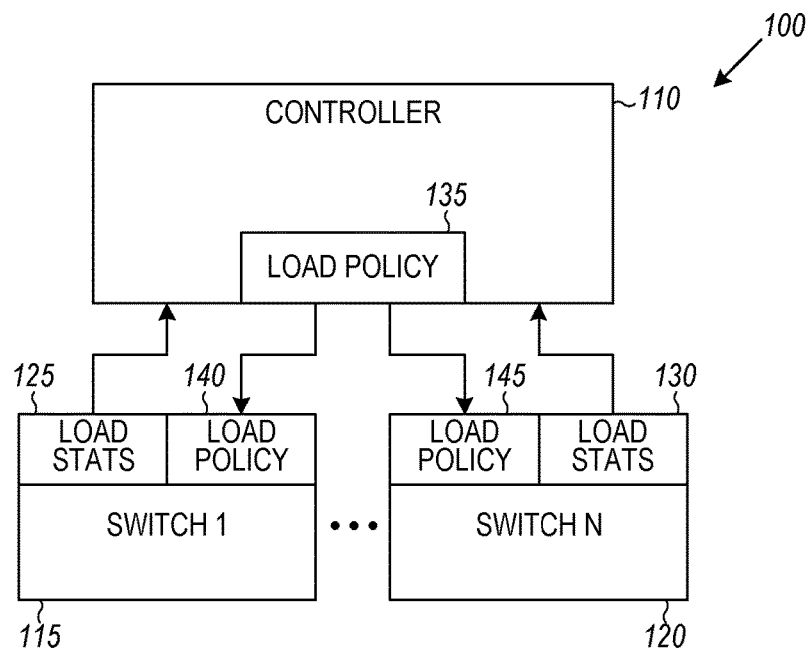
FIG. 1 is a block diagram of a software defined network (SDN) controller managing traffic in an SDN according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A fast-adaptive congestion-free traffic engineering (ACFTE) mechanism for hybrid HT/LT (heavy traffic/light traffic) traffic provides an optimal system framework with joint consideration of local serving sequence and congestion control in a software defined network (SDN). Given global routing paths from a controller, the ACFTE mechanism quickly and automatically adapts to the changes of traffic patterns and employs a flow serving sequence from local information in a real-time manner. Network policies, such as admission control, delay regulation, and congestion control is established through interactions between switches and a controller for a stable SDN.

The mechanism uses a system framework that provides fine-grained delay regulation and fast, delay-guaranteed traffic engineering through a SDN architecture for centralized, global control with less signaling. HT and LT traffic are considered, and a latest packet delay design metric is used to provide loss-free traffic delivery with a bounded delay for hybrid traffic. Information exchange may be significantly reduced over prior methods, and a $2^{nd}$ order convergence rate may be provided.

In various embodiments, a fast-adaptive congestion-free traffic engineering mechanism for hybrid HT/LT traffic optimizes system throughput with delay constraints while jointly considering dynamic and hierarchical congestion-avoidance, admission control, and routing techniques.

The mechanism provides fine grained delay regulation policy within an SDN architecture. Global (hierarchical) delay stability profiles are established for domain, subdomain, switch levels through interactions between switches and a controller, for stable SDN.

A Fast-Adaptive, Congestion-Free Traffic Engineering (ACFTE) mechanism considers globally available routing paths from a controller, ACFTE enables cross-layer optimal control to quickly adapt to the changes of traffic patterns via fast congestion control and flow serving sequence & rate control from local switches in real-time. The mechanism may achieve highest admissible traffic rates and optimal throughput under a bounded network delay.

FIG. 1 is a block diagram of a software defined network (SDN) 100 traffic controller 110 managing traffic in an SDN according to an example embodiment. Multiple switches, represented by switches 115 and 120 that are coupled by links. The switches are programmable by the control 110 to route hybrid traffic, such as packets. In one embodiment, the switches maintain traffic load statistics at 125 and 130. The statistics may be representative of traffic handled by the respective switches, such as delays in forwarding packets, and percentages of packets accepted for forwarding and rejected, and are suitable for use by the controller in calculating a load policy at 135 for each switch. The load policies in one embodiment comprise an adjusted rate decision policy that is determined as a function of calculated end to end delay for use by each local switch and established delay-stability regions. The load policies are provided to the switches as indicated at 140 and 145, and may be used to determine whether or not to accept offered hybrid traffic loads at each switch.

Figure 2:
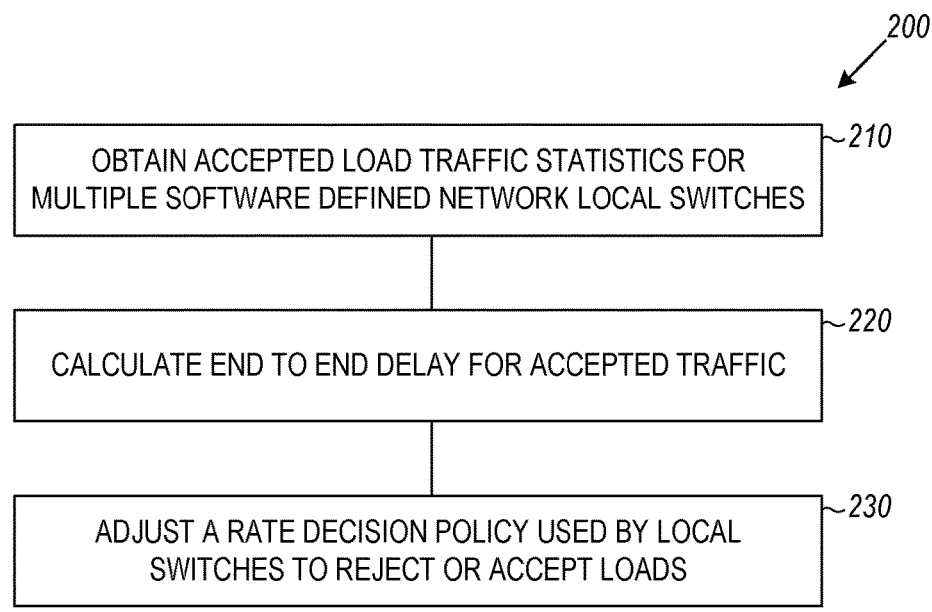
FIG. 2 is a flowchart illustrating a method of controlling the SDN of FIG. 1 according to an example embodiment.

FIG. 2 is a flowchart illustrating a method 200 of controlling the SDN of FIG. 1 according to an example embodiment. Method 200 includes obtaining at 200, accepted load hybrid traffic statistics at a controller of the SDN that includes multiple local switches coupled by links. At 220, the controller calculates end to end delay associated with the accepted hybrid traffic. At 230, the controller determines an adjusted rate decision policy as a function of the calculated end to end delay for use by each local switch and determined network stability thresholds that define established delay-stability regions to determine whether or not to accept the offered loads.

Figure 3A:
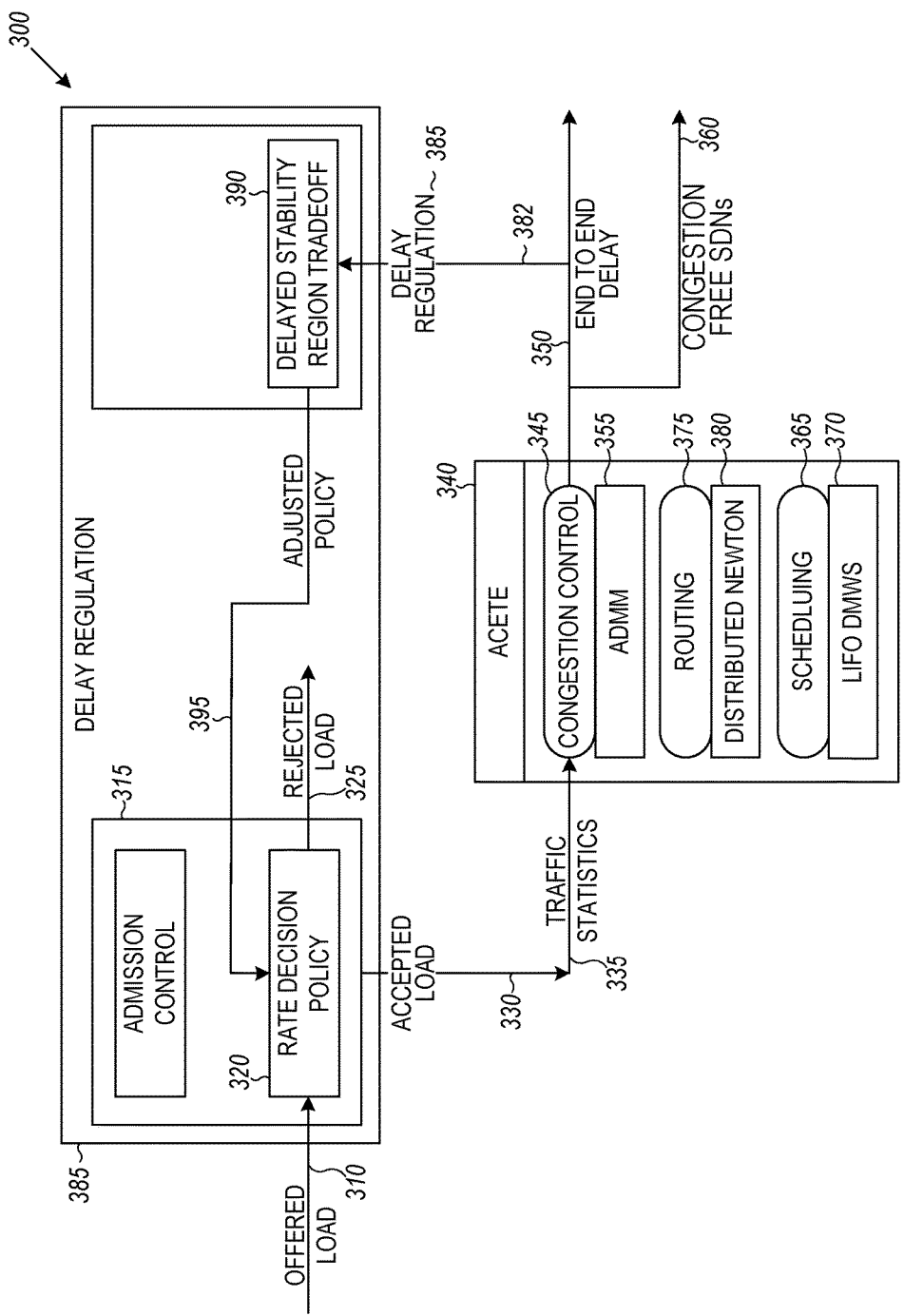
FIG. 3A is a block diagram of a software defined network (SDN) traffic controller according to an example embodiment.

FIG. 3A is a detailed block diagram of one example software defined network traffic controller indicated generally at 300. Traffic from one or more origins is indicated as an offered load at 310 and is provided to an admission control function 315. Admission control 315 applies a rate decision policy 320 to the offered load 310 and may reject some of the traffic as indicated by a rejected load output 325 if the offered load exceeds a threshold. The threshold in one embodiment may be a simple per second limit, such as 15 Mb per second in one embodiment, and may also include traffic priority considerations in deciding whether or not to reject traffic such that traffic with a higher priority may be accepted even if the threshold is exceeded.

Traffic that is accepted is shown by an accepted load output 330 that includes one or more traffic statistics, such as average arrival rates or mean data rates of accepted flows, indicated at 335 that are provided to a fast-adaptive congestion-free traffic engineering (ACFTE) mechanism 340. In one embodiment, the traffic statistics are provided to a congestion control function 345 that calculates an end to end delay 350 based on fast-adaptive control through use of the statistics in an alternating direction method of multipliers (ADMM) indicated at 355. In one embodiment, ACFTE 340 will assign accepted loads with their corresponding optimal end-to-end routes. The end-to-end delay then can be collected when these loads go through the assigned paths. The accepted load is also provided to ACFTE 340 to provide congestion-free SDNs as indicated at 360.

In one embodiment, a scheduling function 365 uses a last in first out (LIFO) and a delay maximum weight scheduling (DMWS) algorithm 370 to schedule traffic. A routing function 375 uses a distributed newton algorithm to control the routing of traffic by finding additional routes when needed or rerouting traffic to optimize network utilization in times of heavy traffic.

Congestion control 345 also provides a delay regulation signal on a line 382 to a delay regulation function 385. The delay regulation signal is generated based on a calculated delay stability region of the network and may be used by a delay-stability region tradeoff function 390 to adjust the rate decision policy 320 of admission control 315 in accordance with an E2E delay and a calculated tradeoff between the delay and stability. A stability region may be derived according to current traffic statistics and a calculated delay of a last packet in the queue that is to be sent. The stability region in one embodiment may be defined as a set of allowable traffic arrival rates which can be covered by scheduling the traffic in accordance with a traffic policy and which won't cause network congestion and thus maintain network stability. Setting lower delay requirements may shrink the stability region, and the rate decision policy 320 may be adjusted according to the new stability region. The delay is thus used to modify the policy 320.

In one embodiment, the ACFTE 340 throughput-optimality provides the stability region. Arrive patterns within the stability region can be completely served by the ACFTE without causing any link congestion. Results obtained from this optimality enhance the design of a powerful admission control upon the SDN controller. Accessibility of global and real-time traffic information may be utilized to establish the rate decision policy 320, which establishes a stability region, accepts sets of traffic arrival rates that are within the stability regions and rejects the remaining arrivals, yielding congestion-free SDNs from throughput-optimality and stability region.

ACFTE 340 provides the ability to control delay via admission control 315 in a local switch. Admission control is a function used to determine whether or not to accept an offered load of traffic at edge switches, which are switches that receive traffic for a network and route such traffic to other switches toward a destination. Regulation of network delay may be globally done, providing a bounded delay regulation policy, achieving maximum available network capacity for hybrid traffic under a bounded network delay. Such ability is an improvement on prior methods which may be based on shortest-path searching, fixed route assumptions, use of shadow queues and other mechanisms.

Given routing decisions, a joint optimization cross-layer framework utilizing the ACFTE 340 is used find the optimal allowable traffic arrival rates and throughput-optimal serving sequence and rate control at the same time. The cross-layer optimization may be formulated as:

Objective: Maximize the allowable traffic arrival rates
Constraints: Link serving capacity constraint, flow conservation (possible automatic route selection), and bounded delay.

Throughput optimal flow serving sequence is performed by the scheduling function 365 utilizing the LIFO-DMWS 370. Accelerated routing 375 utilizes the distributed Newton method 380, and fast-adaptive congestion control 345 is performed via alternating direction method of multipliers (ADMM) 355. Together, these functions control the routes that are used for the traffic, adding routes for some traffic flows and reducing the number of routes for other traffic flows in a dynamic, adaptive manner responsive to flow throughout the SDN as it occurs.

Figure 3B:
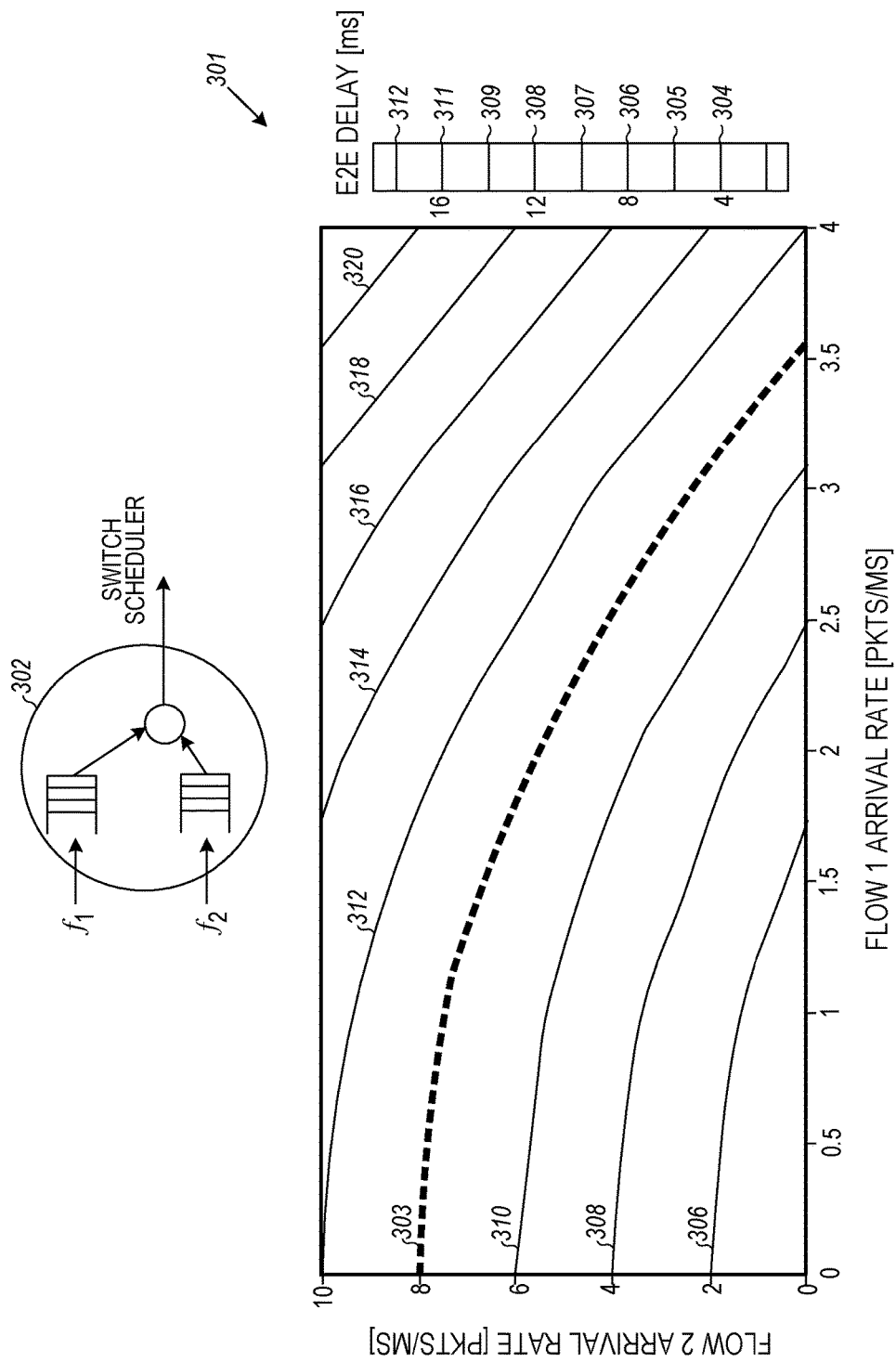
FIG. 3B is a graph 301 illustrating a delay-stability region tradeoff according to an example embodiment.

FIG. 3B is a graph 301 illustrating a delay-stability region tradeoff. Two flows, $f_1$ and $f_2$ are provided to a switch as indicated at 302, and comprise an arrival rate vector. Graph 301 shows multiple regions of end to end delays in ms, ranging from zero to 19 ms in one example, with arrival rate vectors illustrated by a y axis of $f_2$ flow arrival rate in terms of packets per ms versus an x axis of $f_1$ flow arrive rates. A stability threshold 303 indicates the arrives rates of both flows where arrival rates below the threshold are within the stability region, and arrival rates above the threshold 303 result in an unstable network. Strict delay requirements result in a small stability region, while loose delay requirements result in a large stability region. A small stability region corresponds to fewer combinations of allowable traffic arrival rate vectors and a larger stability region corresponds to more combinations of allowable traffic arrival rate vectors. End-to-end delays in ms are indicated by lines 304, 305, 306, 307, 308, 309, 311, and 312, as included in a key to the right of the graph and also indicated on the graph for ease of illustration.

The stability region may be determined or calculated for example, by a stochastic methodology for single-hop traffic using queueing network theory with a scheduling algorithm (e.g., the proposed flow serving sequence and rate control methods described herein.) In one embodiment, maximum feasible traffic arrival rates with respect to bounded system delay are obtained, as indicated in FIG. 3B. For multi-hop traffic, the method of determining the stability region may be similar to the single-hop case, but additionally exploits queueing network theory with a designated routing algorithm. Alternatively, an analytic solution may be used, but may involve a fairly complicated analysis.

A further alternative to determine a stability region may utilize a statistical analysis by running a randomized algorithm with respect to various traffic arrival rates. Corresponding delays may be collected. An area is then drawn that gives bounded delay as the stabile region, providing an efficient approach to obtain the stability-region for end-to-end transmissions (i.e., multi-hop traffic.)

Thus, the stability region may be derived according to the methods described above and desired (lower) delay requirements with (shrank) stability region may be set. The rate decision policy 320 may then be adjusted according to the new stability region.

Figure 4:
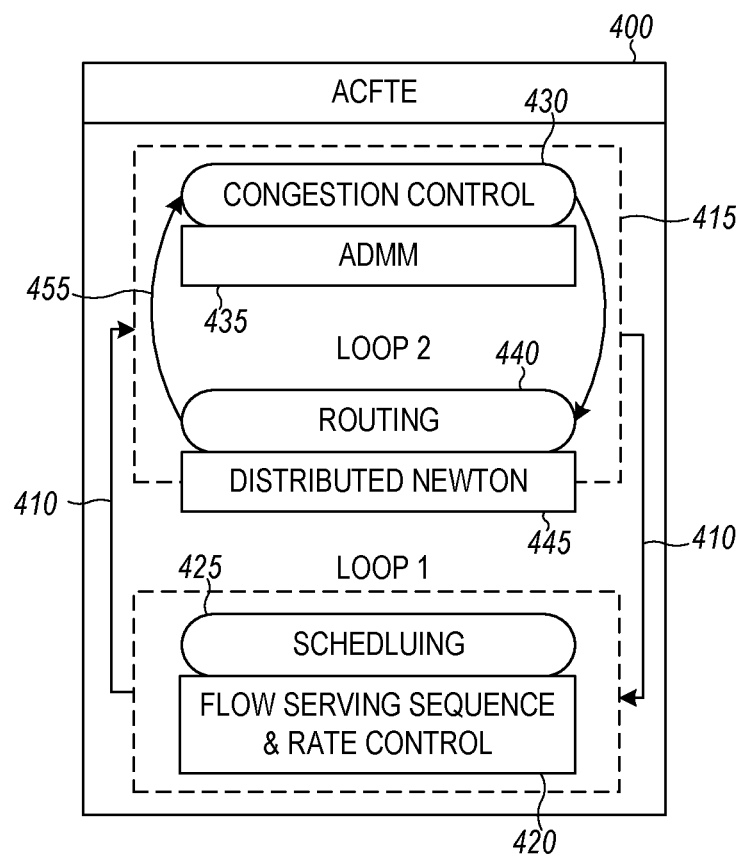
FIG. 4 is a block flow diagram illustrating a fast and adaptive congestion avoidance traffic engineering mechanism that decouples a very complex joint optimal problem into two sub-problems according to an example embodiment.

FIG. 4 is a block flow diagram illustrating a fast and adaptive congestion avoidance traffic engineering mechanism 400 that decouples a very complex joint optimal problem into two sub-problems that are solved using a first loop 410 and a second loop 415. The first sub-problem involves flow serving sequence and rate control 420 to decide the serving sequence and rate for local switches which are adjusted according to global network states to provide scheduling 425. The second sub-problem involves congestion control 430 for a given routing 440 based on feasible routing routes provided by one or more controllers. Fast adaptive control 435 of traffic injection rates is provided.

In the first loop 410, feedback adaptive control 435 of the two sub-problems is performed to iteratively find optimal solutions. In the second loop 415, when given routing 440 decisions change, fast adaptive control 435 is used to automatically regulate flow control policies through inner feedback loop 450, 455. In one embodiment, a primal-dual iterative updating algorithm, also referred to as a distributed newton algorithm 445.

Figure 5:
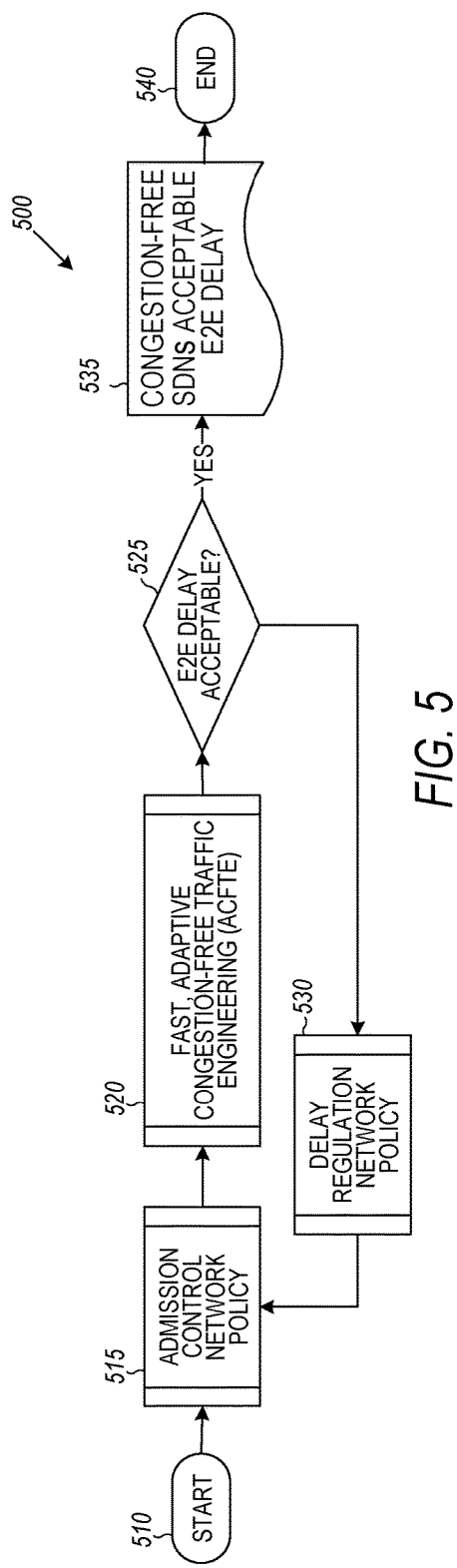
FIG. 5 is a block flow diagram illustrating a method of fast and adaptive congestion avoidance traffic engineering (ACFTE) in SDNs according to an example embodiment.

FIG. 5 is a block flow diagram illustrating a method of fast and adaptive congestion avoidance traffic engineering in SDNs generally at 500. Method 500 begins at 510. An initial admission control network policy is set 515 and used to accept traffic by one or more switches in the SDN. At 520, the ACFTE 340 receives traffic statistics 335 and determines at 525 whether the E2E delay is acceptable. If not acceptable, a delay regulation network policy is generated at 530 and provided to modify the admission control network policy 515. If the delay is acceptable at 525, the network is determined to be a congestion free SDN with acceptable E2E delay at 535 and the method ends at 540. 525 and 530 comprise flow serving sequence and rate control 420 in one embodiment. Method 500 in one embodiment is continuously run on a periodic basis in some embodiments to provide adaptive modification of the network policy.

Figure 6:
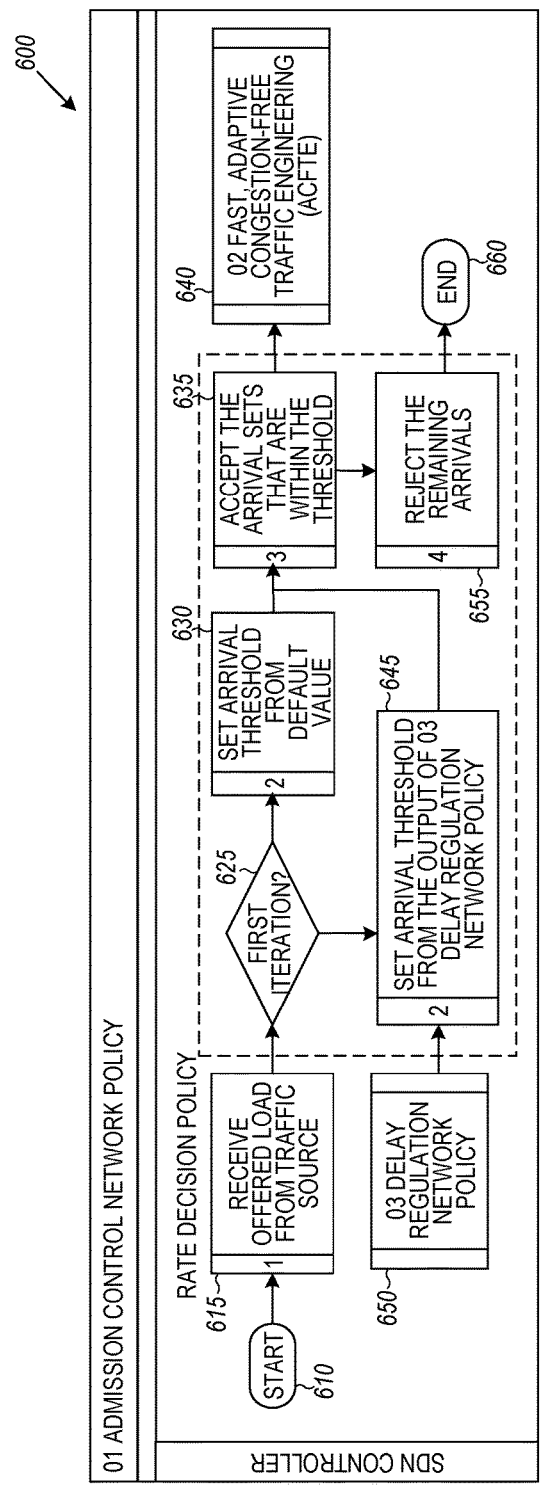
FIG. 6 is a block flow diagram illustrating a method for adapting an admission control network policy according to an example embodiment.

FIG. 6 is a block flow diagram illustrating a method 600 for adapting an admission control network policy. Method 600 begins at 610 and an offered load 310 is received at 615 by admission control indicated by broken line 620. If this is the first time that an offered load has been received, referred to as a first iteration at decision block 625, an arrival threshold is set based on a default value at 630. Arrival sets that are within the threshold are accepted at 635 and the ACFTE function 340 receives traffic statistics as indicated at 640. If this is not the first iteration, the arrival threshold may be adapted at 645 based on an output 395 of the delay regulation function 385 as indicated at delay regulation network policy block 650. Arrival sets that are outside the threshold as determined at 635, are rejected as indicated at 655, and the first iteration of method 600 ends at 660. Successive iterations of method 500 utilize the adapted policy which is derived from traffic statistics 335 as illustrated in FIG. 8.

Figure 7:
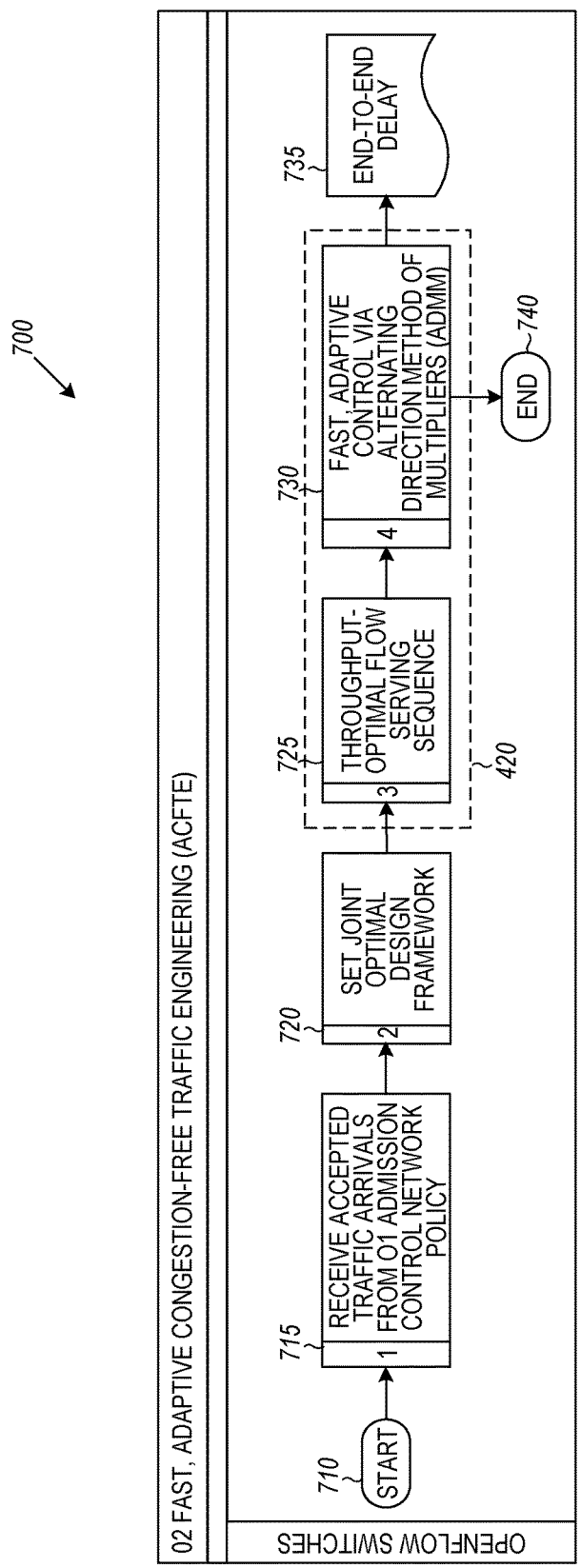
FIG. 7 is a block flow diagram illustrating a method implemented by ACFTE according to an example embodiment.

FIG. 7 is a block flow diagram illustrating a method 700 implemented by ACFTE 340. Method 700 starts at 710 and receives accepted traffic arrivals at 715 from admission control 315 which implements the rate decision policy 320. At 720, a joint optimal design framework is set and throughput-optimal flow serving sequence 725 is performed. At 730, fast adaptive control is performed via the ADMM 355 to provide an E2E delay at 735. Method 700 ends at 740.

Figure 8:
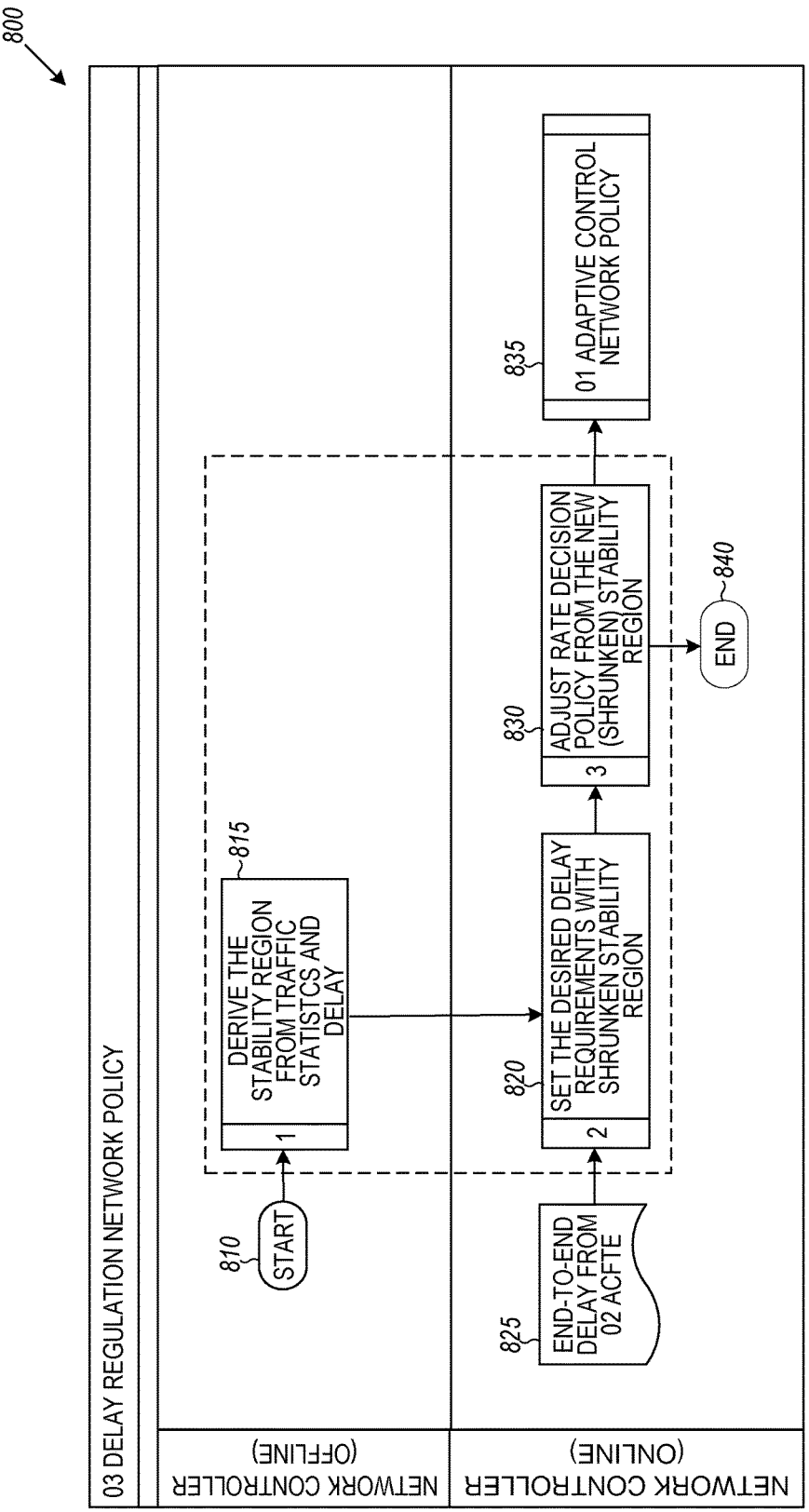
FIG. 8 is a block flow diagram illustrating a method of adjusting a delay regulation network policy according to an example embodiment.

FIG. 8 is a block flow diagram illustrating a method 800 of adjusting a delay regulation network policy. Method 800 starts with the network controller 315 offline at 810, and a stability region from traffic statistics and delay is determined at 815, where a tradeoff between delay and a stability region is performed which may shrink the stability region. The stability region is calculated once at the beginning of method 800.

At 820, the network controller 300 comes online, operating on offered loads, and desired delay requirements are set with a shrunken stability region based on the E2E delay 825 obtained from E2E delay 735 shown in FIG. 7. At 830, the rate decision policy 320 may be adjusted from the new stability region, resulting in a new adaptive control network policy indicated at 835, which is used at 515 in method 500 shown in FIG. 5. Method 800 ends at 840, and may continuously update the adaptive control network policy in some embodiments responsive to changes in network traffic.

Figure 9:
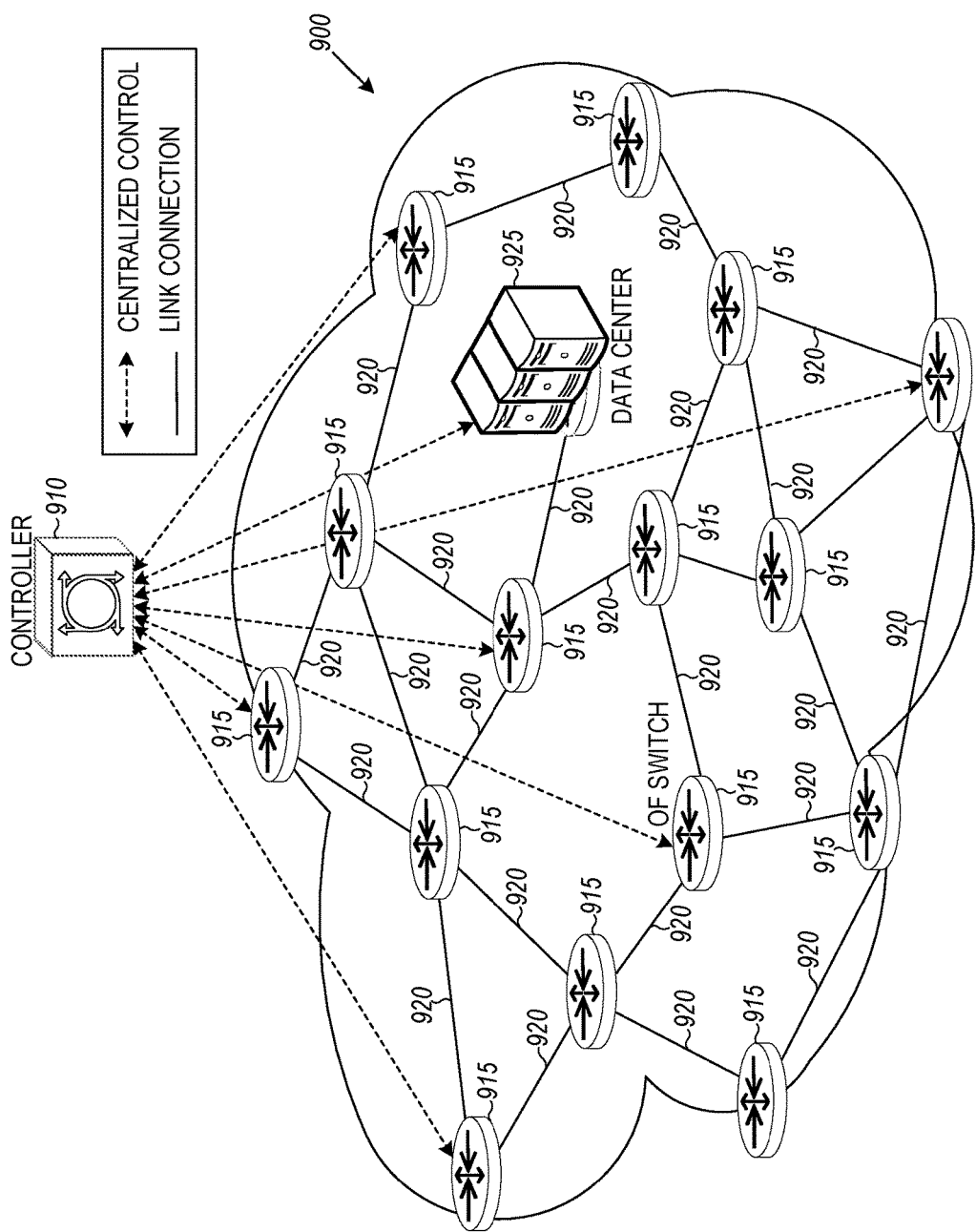
FIG. 9 is a block diagram of an SDN having a centralized controller according to an example embodiment.

FIG. 9 is a block diagram of an SDN 900 having a centralized controller 910 corresponding to controller 300 in FIG. 3. SDN 900 includes multiple switches 915 with communication links, referred to as link connections 920 between the switches for carrying packets back and forth between the switches 915. In one embodiment, the switches 915 comprise OpenFlow (OF) switches, which implement a communications protocol that enables network controllers to determine the path of network packets across a network of switches, facilitating control of an SDN by controller 910. Controller 910 may include an admission control network policy, delay regulation network policy, and optimal design framework illustrated in FIG. 3. Further, a congestion control and flow serving sequence corresponding to scheduling 365 may also be included in controller 910. A data center 925 may also be coupled to at least one switch 915 and provide services, such as cloud based services for transaction processing or other services to one or more source and destination nodes (not shown) coupled to the switches. Such nodes may include cell phones, internet of things devices, user computers, and other devices in various embodiments.

Switches that connect at an edge of the network are offered traffic loads from other networks, or other traffic generating devices which may be coupled to the edge switches. The edge switches in one embodiment implement the rate decision policies to determine whether or not to accept the traffic loads. In some embodiments, edge switches may be routers or routing switches that provide entry points into an enterprise or service provider core network, such as network 900. Edge switches may also be referred to as access nodes or service nodes.

Figure 10:
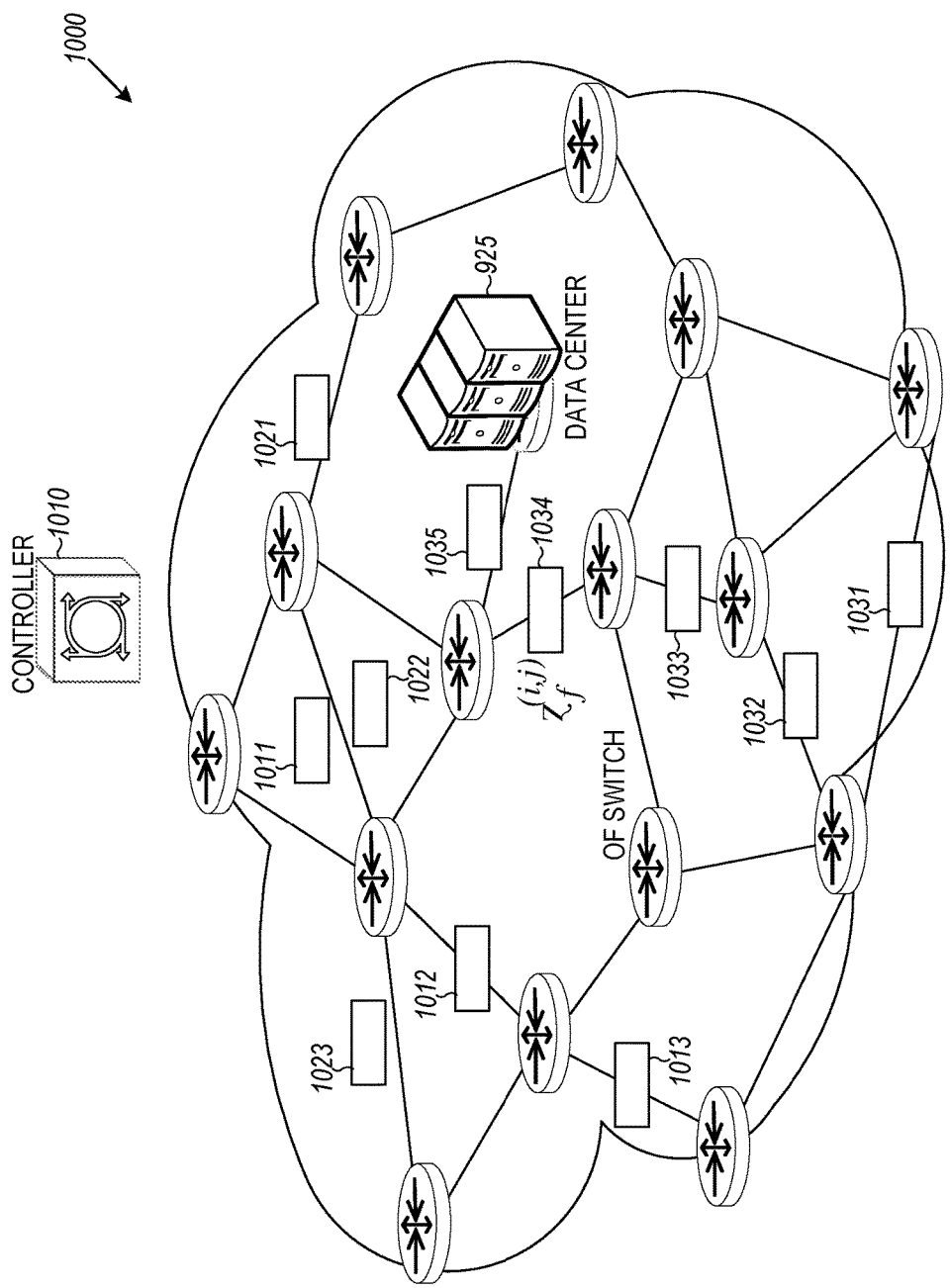
FIG. 10 is a block diagram of an SDN to illustrate data flow routing according to an example embodiment.

FIG. 10 is a block diagram of an SDN 1000 that includes the same switches 915 and links 920, with the user of fewer reference numbers for the switches and links for reducing complexity of the diagram and allow for the use of further reference numbers to illustrate data flow routing. Rectangles are used to represent data flows on links that the rectangles are adjacent to.

A first data flow includes rectangles 1011, 1012, and 1013, illustrating progression of the data over links of sequentially coupled switches. A second data flow includes rectangles 1021, 1022, and 1023, illustrating progression of data over links of sequentially coupled switches. Note that one link includes two data flows represented at 1011 and 1022, which may result in increased traffic flow via that link. A third data flow includes rectangles 1031, 1032, 1033, 1034, and 1035 leading to the data center 925. The third data flow does not share any links with the first and second data flows in this simplified example. Note that the data flow indicated at rectangle 1034 is between two switches or nodes i and j, and the flow is represented mathematically as $Z_f^{(i,j)}$.

Figure 11:
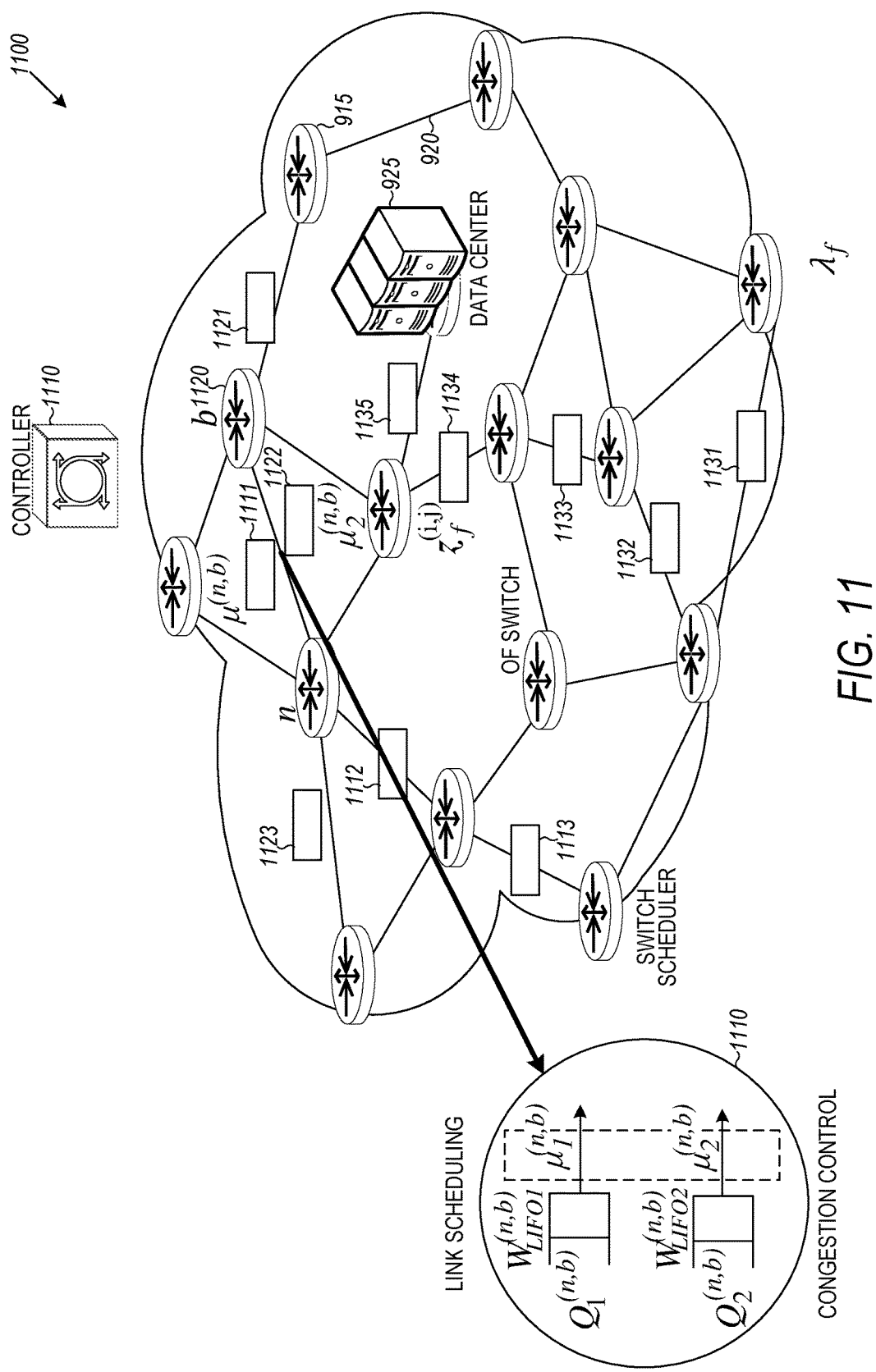
FIG. 11 is a block diagram of an SDN to illustrate congestion control and data flow routing control according to an example embodiment.

FIG. 11 is a block diagram of an SDN 1100 that includes the same switches 915 and links 920, with the user of fewer reference numbers for the switches and links for reducing complexity of the diagram and allow for the use of further reference numbers to illustrate congestion control and data flow routing control as indicated at 1110. The congestion and flow routing control 1110 illustrates queues that correspond to packets from the respective first 1011 and second 1022 flows between nodes n and b, indicated at 1115 and 1120 respectively. Note that there is a queue for each flow, $u_1^{(n,b)}$ and $u_2^{(n,b)}$ indicated as $Q_1$ and $Q_2$. The queues are LIFO queues with a weighting time indicated as $W^{(n,b)}$. $Z_f^{(i,j)}$ denotes the amount of traffic (e.g., data rate) that flow f will need to go through link (i,j) in flow f's multi-hop transmissions.

FIG. 12 is illustrates a cross-layer system design problem to be solved for an optimal joint design framework in order to find the optimal allowable traffic arrival rates and throughput optimal serving sequence at the same time. As previously indicated, the cross layer optimization problem may be formulated as an object of maximizing the allowable traffic arrival rates in light of constraints that include a link serving capacity constraint, a flow conservation (such as automatic route selection) with a bounded delay for packets. FIG. 12 provides a mathematical representation of the design problem generally at 1200, setting forth a network utility function 1205 based on flow pairs, where beta, β, and alpha, α, are constants related to weight for different flows that can be assigned by system architects for ensuring fairness among different flows. Traffic arrival rates 1206, $\lambda_f$, ∀f, routing decisions 1207, ∀(i,j), and link capacities 1208, $u^{(i,j)}$, are also defined.

The cross layer system design problem is then stated as indicated at 1210, with an equation to solve, designated as Find 1212, and an equation 1215 to maximize the sums of flows (allowable traffic arrival rates) to ensure that all flows are less than the link capacities, subject to multiple constraints, as described above.

A first constraint, 1220, is a link serving capacity constraint. Traffic arrivals to a link should be less than or equal to the ink capacity. A second constraint 1225 is a flow conservation constraint. The incoming traffic to a link should be equal to the outgoing traffic of the link, unless the node i (i.e., the sender) is a source node of a flow. At 1230, all variables that will be optimized or determined via optimization framework should be non-negative.

FIG. 13 is a slide that illustrates one method of solving the cross layer system optimization problem. In one embodiment, a Lagrangian technique 1310 may be used. In the Lagrangian technique: An objective is combined with constraints into a single multi-variable function. sigma_1~5 are the Lagrange multipliers. Hence, an un-constrained optimization problem may be solved.

The original problem may be decoupled into two sub-problems in one embodiment, first solving a flow serving sequence at 1315, and second, solving a congestion control problem with given routing at 1320. The flow serving sequence is presented as a single un-constrained optimization problem that is we decouple it into two sub-problems and solved respectively. The flow serving sequence is related to Lagrange multiplier sigma_5 at 1315. Congestion control as indicated at 1320 (with given routing from the controller) may be solved by relating the objective and the rest of constraints (multiplier sigma_1~4). Details of the function g(x) are provided at 1325.

FIG. 13, along with the following figures illustrate feasibility of the network control that may be achieved by the present subject matter, and provide some example algorithms for achieving optimization of data flows in an SDM network while maintaining minimal delays.

FIG. 14 illustrates a method of solving the flow serving sequence for throughput optimal scheduling with respect to hybrid HT/LT traffic. Two possible solutions for flow serving sequence that supports throughput-optimality. The left-hand solution 1410 is a delay-based power-weight serving sequence. The right-hand solution 1420 is a LIFO (last in first out) delay-based weight serving sequence. Both weight assignments include maximum weight (MaxWeight) policy.

In one embodiment, a scheduling decision is found for each link. In one embodiment, a delay based power weight of a feasible scheduler for a given link may be used where the sum of power weighting time of all queues in a switch are considered. Alternatively, a LIFO delay based weight of a feasible scheduler for a link is the sum of the last packet weighting time of all queues included in the switch. A maximum weight policy may be used to activate a feasible scheduler with the maximum weight at any given time slot.

FIG. 15 illustrates a general method of addressing fast congestion control utilizing accelerated joint routing and congestion control generally at 1500, the second sub-problem. The second sub-problem is restated, which belongs to perturbed KKT control system with the second-order penalty as indicated at 1510. The solving steps for the congestion control (i.e., Primal-dual distributed Newton method) include a primal variable x, and dual variable y. The steps include:

1. Rewrite the original sub-problem into perturbed KKT system 1515, which gives the conditions for optimal solutions.
2. Adopt primal-dual iterative updating algorithm 1520
In each iteration:
   2a. Decide step size
   2b. Decide primal and dual variable updating directions
   2c. Update the new primal and dual solutions.

In one embodiment, a second order penalty is used with the primal dual distributed Newton method. The problem may be solved iteratively between a primal and dual domain via the $2^{nd}$ order Newton direction. The $2^{nd}$ order aspect utilizes a rate of change of a rate of change of traffic in order to quickly address rapid changes in traffic patterns and loads.

FIG. 16 illustrates further details at 1600 regarding the primal-dual solution for fast congestion control. Given a step size 1610, the goal is to satisfy the primal and dual feasibilities, guaranteeing a decreasing residual. In one embodiment, a conventional superlinear searching algorithm may be applied as illustrated.

The solving strategy is a second-order method because of 2nd-order Newton directions. Specifically, the Newton method aims to find the updating direction in such a way the minimum values can be obtained in few steps. The Newton method may be used to decide both primal and dual updating directions as indicated at 1615. The primal Newton direction is indicated at 1620 and the dual Newton direction is indicated at 1625.

Figure 17:
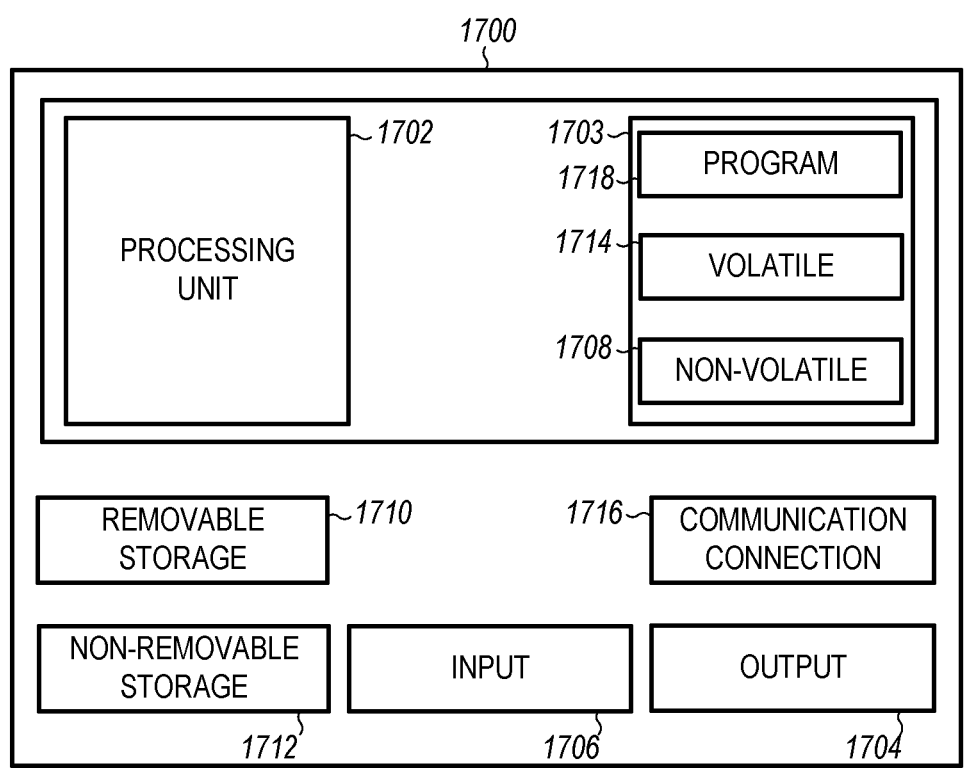
FIG. 17 is a block diagram illustrating circuitry for clients, servers, cloud based resources for implementing the SDN controller and switches according to example embodiments.

FIG. 17 is a block diagram illustrating circuitry for clients, servers, cloud based resources for implementing the SDN controller and switches according to example embodiments. All components need not be used in various embodiments. For example, the controller, source and destination nodes, switches, and data center may each use a different set of components, or in the case of servers for example, larger storage devices.

One example computing device in the form of a computer 1700 may include a processing unit 1702, memory 1703, removable storage 1710, and non-removable storage 1712. Although the example computing device is illustrated and described as computer 1700, the computing device may be in different forms in different embodiments. For example, the computing device may be a blade computer or desktop in a data center for implementing a virtual switch, or other computing device including the same or similar elements as illustrated and described with regard to FIG. 17. Devices, such as blade computers or desktop computers are generally collectively referred to as computer devices or user equipment. Further, although the various data storage elements are illustrated as part of the computer 1700.

Memory 1703 may include volatile memory 1714 and non-volatile memory 1708. Computer 1700 may include—or have access to a computing environment that includes—a variety of computer-readable media, such as volatile memory 1714 and non-volatile memory 1708, removable storage 1710 and non-removable storage 1712. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1700 may include or have access to a computing environment that includes input 1706, output 1704, and a communication connection 1716. Output 1704 may include a display device, such as a touchscreen, that also may serve as an input device. The input 1706 may include one or more of a touchscreen, touchpad, mouse, keyboard, camera, one or more device-specific buttons, one or more sensors integrated within or coupled via wired or wireless data connections to the computer 1700, and other input devices. For a switch or virtual switch, the input 1706 and output 1704 may be in the form of a network interface card. The computer in one embodiment operates in a networked environment using a communication connection to connect to one or more remote computers, such as database servers. The remote computer may include a personal computer (PC), server, router, switch, a peer device or other common network node, or the like. The communication connection may include a Local Area Network (LAN), a Wide Area Network (WAN), or other networks.

Computer-readable instructions stored on a computer-readable medium are executable by the processing unit 1702 of the computer 1700. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 1718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1700 to provide generic access controls in a COM based computer network system having multiple users and servers.

In various embodiments, a framework is provided to consider joint design with elephant (heavy tail) flows for congestion free networks. The framework considers a fast adaptive congestion control and optimal throughput with respect to hybrid elephant and mice (light tail) flows. Delay improvement for a controller-switch architecture exploits the merits of software defined networking. Optimal throughput is provided for hybrid traffic, combined with fast learning and automatically adapting to changes of traffic patterns. Delay regulation is provided with limited signaling overheads. The framework serves as a foundation for designing congestion-free traffic engineering.

Several advantages may also be provided by the framework including the use of global information visibility of an SDN controller to enable congestion-avoidance in view of elephant flows of networks. A joint design of flow serving sequence, routing, and congestion control is provided without the need of traffic statistic knowledge. The fast-adaptive congestion-free traffic engineering (ACFTE) quickly and automatically adapts to changes of traffic patterns. Accelerated congestion-free routing via a distributed Newton method and flow serving sequence that guarantees throughput-optimality with hybrid traffic. A controller-switch enhanced mechanism provides an admission control scheme to facilitate congestion free SDNs and delay regulation to regulate control systems better for delay-throughput tradeoff.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
    obtaining traffic statistics of accepted hybrid traffic at a controller of a software defined network that includes multiple local switches coupled by links;
    calculating an end to end delay associated with the accepted hybrid traffic;
    determining network stability thresholds from each local switch as a function of network congestion; and
    determining adjusted rate decision policies for the multiple local switches as a function of the end to end delay and the network stability thresholds, the determining including iteratively:
        optimizing serving sequences and rate control for the multiple local switches to adjust data routing for the network;
        applying fast adaptive control based on the adjusted data routing to automatically adjust the rate decision policies; and
        calculating an updated end to end delay and an updated stability threshold based on the adjusted data routing and the adjusted rate decision policies, wherein the iterations continue until the updated end to end delay conforms to a desired delay; and
    applying the adjusted rate decision policies to the edge switches of the multiple local switches to control whether each of the edge switches accepts offered traffic loads.

2. The method of claim 1 wherein the network stability thresholds define delay stability regions that comprise a set of allowable traffic arrival rates which can be covered by scheduling the traffic in accordance with a traffic policy and which do not cause network congestion.

3. The method of claim 1 wherein the accepted hybrid traffic includes heavy tail (HT) traffic and light tail (LT) traffic.

4. The method of claim 3 wherein the end to end delay comprises a latest packet delay and wherein the adjusted rate decision policy is adjusted to provide a bounded delay for the accepted hybrid traffic.

5. The method of claim 1 further including adjusting the data routing as a function of the statistics of the accepted hybrid traffic.

6. The method of claim 1 wherein:
    optimizing serving sequences and rate control for the multiple local switches to adjust data routing for the network comprises:
        performing scheduling based on a last in first out (LIFO) delay maximum weight scheduling (DMWS) function; and
        performing routing based on a distributed Newton function; and
    applying fast adaptive control based on the adjusted data routing to automatically adjust the rate decision policies comprises performing congestion control through alternating direction method of multipliers (ADMM).

7. The method of claim 6 wherein the distributed Newton function converges according to a second order function.

8. A system comprising:
a processor;
a network connector configured to couple the processor to a software defined network that includes multiple local switches coupled by links; and
a storage device configured to store a program for execution by the processor, the program configuring the processor as a controller for the software defined network by configuring the processor to perform operations comprising:
obtaining traffic statistics of accepted hybrid traffic;
calculating an end to end delay associated with the accepted hybrid traffic;
determining network stability thresholds from each local switch as a function of network congestion; and
determining adjusted rate decision policies for the multiple local switches as a function of the end to end delay and the network stability thresholds, the determining including iteratively:
optimizing serving sequences and rate control for the multiple local switches to adjust data routing for the network;
applying fast adaptive control based on the adjusted data routing to automatically adjust the rate decision policies, and
calculating an updated end to end delay and an updated stability threshold based on the adjusted data routing and the adjusted rate decision policies, wherein the iterations continue until the updated end to end delay conforms to a desired delay; and
applying the adjusted rate decision policies to edge switches of the multiple local switches to control whether each of the edge switches accepts offered traffic loads.

9. The system of claim 8 wherein the network stability thresholds define delay stability regions that comprise a set of allowable traffic arrival rates which can be covered by scheduling the traffic in accordance with a traffic policy and which do not cause network congestion.

10. The system of claim 8 wherein the accepted hybrid traffic includes heavy tail (HT) traffic and light tail (LT) traffic.

11. The system of claim 10 wherein the end to end delay comprises a latest packet delay and wherein the adjusted rate decision policy is adjusted to provide a bounded delay for the accepted hybrid traffic.

12. The system of claim 8 wherein the operations further comprise adjusting routing as a function of the accepted hybrid traffic statistics.

13. The system of claim 8 wherein:
optimizing serving sequences and rate control for the multiple local switches to adjust data routing for the network comprises:
performing scheduling based on a last in first out (LIFO) delay maximum weight scheduling (DMWS) function; and
performing routing based on a distributed Newton function; and
applying fast adaptive control based on the adjusted data routing to automatically adjust the rate decision policies comprises performing congestion control through alternating direction method of multipliers (ADMM).

14. The system of claim 13 wherein the distributed Newton function converges according to a second order function.

15. A computer readable storage device having instruction stored thereon for execution by a processor configured as a controller of a software defined network that includes multiple local switches coupled by links, the instructions configuring the processor to perform operations comprising:
obtaining traffic statistics of accepted hybrid traffic;
calculating an end to end delay associated with the accepted hybrid traffic;
determining network stability thresholds from each local switch as a function of network congestion; and
determining adjusted rate decision policies for the multiple local switches as a function of the end to end delay and the network stability thresholds, the determining including iteratively:
optimizing serving sequences and rate control for the multiple local switches to adjust data routing for the network;
applying fast adaptive control based on the adjusted data routing to automatically adjust the rate decision policies, and
calculating an updated end to end delay and an updated stability threshold based on the adjusted data routing and the adjusted rate decision policies, wherein the iterations continue until the updated end to end delay conforms to a desired delay; and
applying the adjusted rate decision policies to edge switches of the multiple local switches to control whether each of the edge switches accepts offered traffic loads.

16. The computer readable storage device of claim 15 wherein the network stability thresholds define delay stability regions that comprise a set of allowable traffic arrival rates which can be covered by scheduling the traffic in accordance with a traffic policy and which does not cause network congestion.

17. The computer readable storage device of claim 16 wherein the accepted hybrid traffic includes heavy tail (HT) traffic and light tail (LT) traffic.

18. The computer readable storage device of claim 17 wherein the end to end delay comprises a latest packet delay and wherein the adjusted rate decision policy is adjusted to provide a bounded delay for the accepted hybrid traffic.

19. The computer readable storage device of claim 15 wherein the operations further comprise adjusting the data routing as a function of the statistics of the accepted hybrid traffic.

20. The computer readable storage device of claim 15 wherein:
optimizing serving sequences and rate control for the multiple local switches to adjust data routing for the network comprises:
performing scheduling based on a last in first out (LIFO) delay maximum weight scheduling (DMWS) function; and
performing routing based on a distributed Newton function; and
applying fast adaptive control based on the adjusted data routing to automatically adjust the rate decision policies comprises performing congestion control through alternating direction method of multipliers (ADMM).

21. A method comprising:
obtaining traffic statistics of accepted hybrid traffic loads at a controller of a software defined network that includes multiple local switches coupled by links;
calculating an end to end delay associated with the accepted traffic; and iteratively:
modifying routing as a function of the traffic statistics to achieve maximum available capacity by:

optimizing serving sequences and rate control for the multiple local switches to adjust data routing for the network;

applying fast adaptive control based on the adjusted data routing to automatically adjust rate decision policies; and determining an adjusted rate decision policy as a function of the calculated end to end delay and an established delay-stability region; and calculating an updated end to end delay and an updated stability threshold based on the adjusted data routing and the adjusted rate decision policies wherein the iterations continue until the updated end to end delay conforms to a desired delay;

applying the adjusted rate decision policies to edge switches of the multiple local switches to control whether the edge switches accept offered traffic loads.

22. The method of claim 21 wherein each of the edge switches receives an individual switch adjusted rate decision policy.

23. The method of claim 21 wherein each of the local switches includes a queue containing packets to be sent and determining an adjusted rate decision policy utilizes a delay based weight for each queue of the local switches.

* * * * *

UNITED STATES PATENT AND TRADEMARK OFFICE
CERTIFICATE OF CORRECTION

PATENT NO. : 10,153,974 B2
APPLICATION NO. : 15/380545
DATED : December 11, 2018
INVENTOR(S) : Luo et al.

Page 1 of 1

It is certified that error appears in the above-identified patent and that said Letters Patent is hereby corrected as shown below:

In the Specification

In Column 7, Line 56, after "rates", insert --.--

In Column 9, Line 45, delete "315" and insert --300-- therefor

In Column 11, Line 38, delete "sigma_5" and insert --sigma_1~5-- therefor

In the Claims

In Column 17, Line 6, in Claim 21, after "policies;", delete "and"

Signed and Sealed this
Twenty-eighth Day of April, 2020

Andrei Iancu
*Director of the United States Patent and Trademark Office*